Patented July 21, 1936

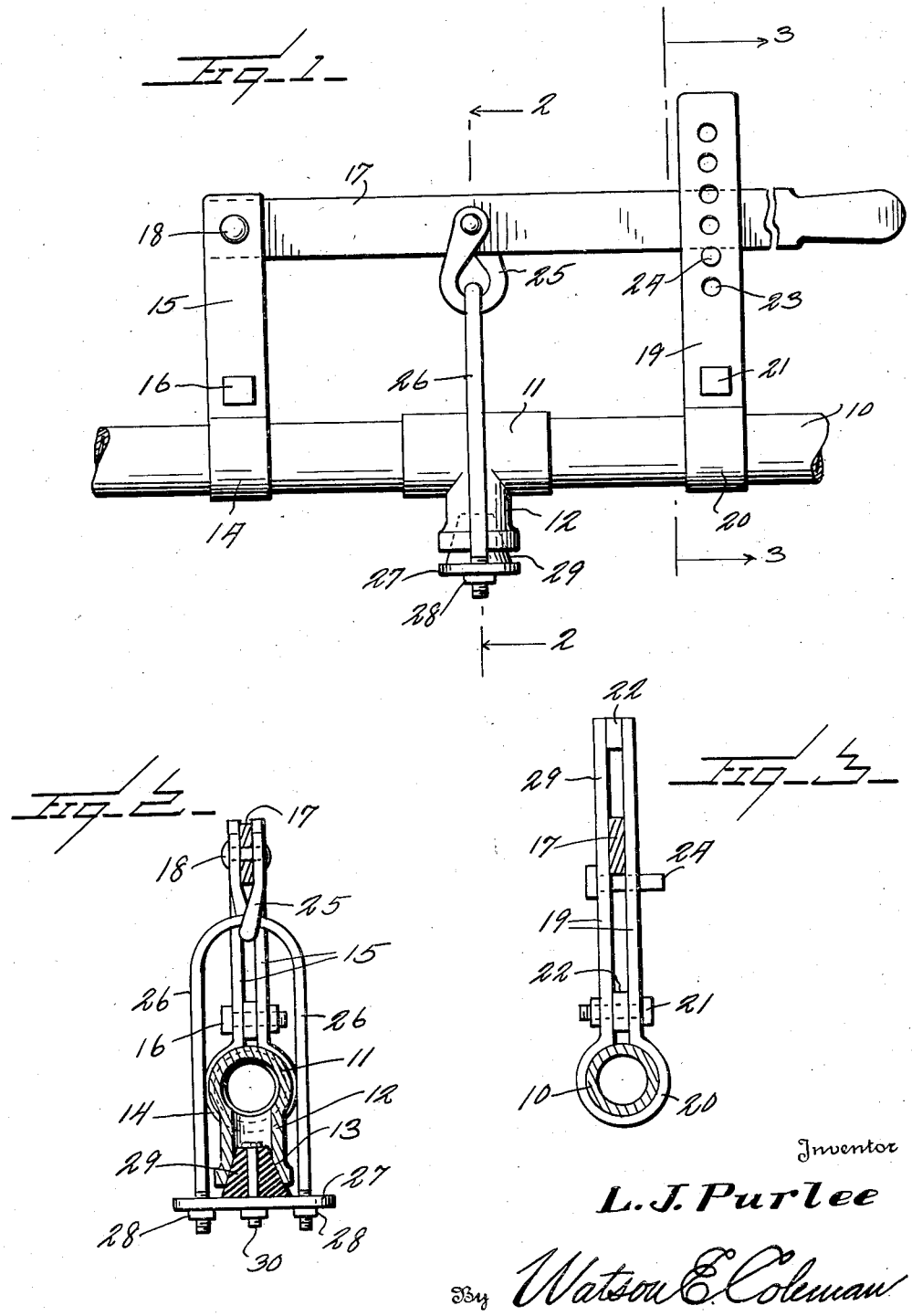

2,048,564

UNITED STATES PATENT OFFICE 2,048,564

PLUG VALVE

Lemuel J. Purlee, East St. Louis, Ill.

Application December 10, 1935, Serial No. 53,803

4 Claims. (Cl. 251—41)

This invention relates to liquid controlling devices in the nature of valves and particularly to a structure designed to take the place of ordinary valves for controlling discharge from on overhead pipe into a tank, though the invention is not necessarily restricted to this use.

The general object of the invention is to provide a very simple and cheaply constructed means whereby a plug valve may be held to a seat within a discharge fitting or shifted away from said seat.

Another object is to provide a device of this character in which the plug valve seats within a downwardly opening discharge fitting, the plug valve having a yoke embracing the fitting and extending upward, and a lever swingingly connecting the yoke whereby the plug may be moved downward or drawn upward, means being provided for holding the lever in an adjusted position and, if necessary, locked in place.

Other objects will appear in the course of the following description.

My invention is illustrated in the accompanying drawing wherein:—

Figure 1 is a side elevation showing one application of my improved plug valve and operating means;

Figure 2 is a section on the line 2—2 of Figure 1;

Figure 3 is a section on the line 3—3 of Figure 1.

Referring to this drawing, 10 designates a pipe line having in its length a fitting 11 in the form of a T, the fitting discharging downwardly by means of the branch 12 and the lower end of the branch 12 being formed with a seat 13.

Shown as mounted upon the pipe 10, though I do not wish to be limited to this, is a clamp 14 of the type illustrated in Figure 3, the clamp being split and extending upward at 15, the split clamp being held upon the pipe by means of a bolt 16. Disposed between the upper ends of the legs of the clamp is one end of a lever 17, which is pivoted to the clamp by any suitable means as, for instance, by a bolt or rivet 18. This lever at its opposite end, as shown in Figure 3, is disposed between the legs 19 of a split clamp 20. This clamp is held in place upon the pipe 10 by means of the bolt 21, the legs of the clamp being held spaced apart by means of the spacers 22. The legs of the clamp are perforated at 23 for the passage of a locking pin 24. The lever is provided with the shackle 25 and swingingly connected to this shackle is a yoke 26, which extends downward and embraces the fitting 11 and at its lower end the legs of this yoke are connected by means of a cross bar 27, the extremities of the yoke passing through the cross bar and being engaged with the cross bar by the nuts 28. Mounted upon the upper face of this cross bar 27 is the plug 29 which may be made of rubber or any other suitable material and is tapered upwardly so as to fit the seat 13. The plug is shown as being connected to the cross bar by means of the bolt 30.

Normally the lever 17 will be held raised by the pin 24 and the plug valve thus held firmly to its seat. When it is desired to permit the discharge of liquid from the pipe 10, the pin 24 is removed and the lever lowered to the desired amount. If the lever is fully lowered, the plug valve will be entirely removed from its seat and in this case, the yoke may be swung laterally to carry the plug valve entirely away from the lower end of the fitting 11 and then the lever may be raised. On the other hand, by adjusting the lever 17 with the plug still partly within the seat 13, a partial discharge may be secured.

While I have illustrated the clamps 19 and 15 as being mounted upon a pipe, I do not wish to be limited to this as these members 15 and 19 might depend from an overhead beam and provide a fulcrum for the lever 17 and a means for latching the lever in any desired position. It is obvious that in place of the pin 24, the hasp of a padlock might be used to lock the lever in place so that the lever could not be shifted downward without authority.

This device is particularly designed to be used where liquid of any kind is discharged into a tank and particularly where the liquid is of a character such as is liable to corrode steel or other metals. Under these circumstances, the yoke 26 and the strap or cross bar 27 may be covered with lead and the rubber plug will be held in place by lead nuts on the bolt 30 or the plug otherwise attached to the cross bar 27. This particular form of valve is leak-proof and can be used in places where ordinary valves do not prove satisfactory. The device is simple and easy to make and has been found particularly effective in practice. The up-keep for such a plug valve as I have shown is low, as there is nothing to wear out and the valve may be shifted to permit a full discharge from the T 11 or a partial discharge as desired.

What is claimed is:—

1. A structure of the character described, including a pipe line having a downwardly discharging T, the discharge opening of the T forming a valve seat, a clamp mounted upon the pipe line and extending upward, a lever pivoted upon said clamp, a second clamp mounted upon the pipe line and having an upwardly extending leg having perforations, means insertible through the perforations of said leg for holding the lever raised or lowered, a shackle carried by the lever, a yoke swingingly mounted upon the shackle and embracing the fitting, a supporting plate carried by the lower end of the yoke, and a plug valve adapted to fit said seat and carried by the supporting plate.

2. A structure of the character described, including a pipe line having a downwardly opening discharge fitting, a plug valve adapted to seat upon an upward movement within the lower end of the fitting and adapted to have a downward movement to a position entirely exterior to the fitting, a yoke supporting the plug valve and disposed exteriorly to the fitting, a support associated with the pipe line, a lever pivoted on said support and to which the yoke is swingingly connected whereby the yoke and valve may be raised or lowered, and means for holding the lever raised.

3. A structure of the character described, including a pipe line having a discharge fitting formed with a seat at the extremity of the discharge end, a yoke embracing the fitting and carrying a tapered plug valve disposed exteriorly of the fitting and normally seating within said seat, the valve and yoke being movable to carry the valve against the seat or to a position entirely exterior to the fitting, a support associated with the pipe line, a lever pivoted on said support and to which the yoke is swingingly connected, and means for holding the lever in a position with the plug valve partly closed or entirely open.

4. A structure of the character described, including a pipe line having a downwardly opening discharge fitting formed with an upwardly tapered seat at its lower end, a supporting member associated with the pipe line, a lever pivoted upon the supporting member, means whereby the lever may be held in any adjusted position, an element disposed exteriorly of the fitting and swingingly connected to said lever and extending downwardly therefrom and an upwardly tapered plug valve supported by said element, the upward movement of the lever carrying the plug valve into the tapered seat in the fitting, the full downward movement of the lever carrying the plug valve entirely out of the fitting, the swinging connection between the supporting element and the lever permitting the supporting element and the plug valve to be swung entirely to one side of the fitting.

LEMUEL J. PURLEE.